Patented Feb. 22, 1927.

1,618,824

UNITED STATES PATENT OFFICE.

JOHN A. S. HAMMOND, OF WOODLAWN, MARYLAND, ASSIGNOR TO U. S. INDUSTRIAL ALCOHOL CO., A CORPORATION OF WEST VIRGINIA.

PROCESS OF PRODUCING CHLOROCARBONATES.

No Drawing.  Application filed July 14, 1924. Serial No. 725,790.

My invention relates to a process for the production of chlorocarbonates, that is to say, either alkyl or aryl chlorocarbonates, but it has relation especially to the formation of ethyl chlorocarbonate.

The object of my invention is to provide a process whereby the chlorocarbonates may be made in an advantageous manner but especially so as to proivde for the production of ethyl chlorocarbonate on a commercial scale. The object of my invention is especially to carry out the process with the use of phosgene $COCl_2$ in such a way as to avoid the necessity of working with large quantities of liquid phosgene which would be disadvantageous in a commercial process. Another object is to provide conditions of operation so as to obtain the highest possible yield of the chlorocarbonate as, for example, by utilizing low temperatures thus avoiding the formation of carbonates from which the chlorocarbonate has to be eliminated; by recovering the chlorocarbonate from the mixture formed in the reaction by the use of solvents, preferably, water; and by obtaining a substantially pure chlorocarbonate by the use of a dehydrating agent and fractionation.

Further objects will appear from the detailed description thereof hereinafter.

While my invention is capable of being carried out in many different ways for the purpose of illustration I shall describe only certain ways of carrying out the same hereinafter.

For example, in carrying out my invention I may run gaseous phosgene into alcohol having a high strength, for instance, absolute alcohol, which is cooled to a temperature of from 0° C. to 60° C. but, preferably, a temperature of 20° C., the cooling of the alcohol being effected, if desired, by the use of an ice-salt bath around the same. The reaction is conducted at these low temperatures so as to avoid, as far as possible, the formation of diethyl carbonate. The conditions of reaction are such as to preferably use approximately 95.5 grams of phosgene with 58 grams of absolute ethyl alcohol, which in about 30% in excess of the theoretical quantity required to form ethyl chlorocarbonate. This exact excess is not necessary, however, as any excess up to 100% over the theoretical amount will be found to be permissible, although an excess of 30% is preferable. The phosgene is preferably introduced into the absolute alcohol at the rate of 50 grams per hour, although it is not necessary to have it introduced at that rate. At the end of the run the reaction mixture is washed with an amount of water equal to one to three times the volume of the ester mixture, that is to say, preferably 300 c. c. of water, so as to cause the oil layer containing the ethyl chlorocarbonate to separate out from the water layer. The amount of water used is kept as low as possible while effectively forming the oil layer. The hydrochloric acid and the remaining ethyl alcohol will be found in the water layers. The layers may then be separated and, if desired, this can be done in a separatory funnel. The oil layer is now dried by adding thereto 20 grams of anhydrous calcium chloride which is allowed to remain in the liquid approximately three hours. The amount of the calcium chloride used, however, depends upon the amount of water introduced and ordinarily the amount may be anywhere from 5% to 40% by weight of the oil layer to be treated with the calcium chloride. Instead of the calcium chloride there may be used any other known dehydrating agent as, for example, sodium sulfate or copper sulfate. After this the liquid may be removed from the dehydrating agent and fractionated to obtain a purer product. The ethyl chlorocarbonate will begin to come over at 92° C. and will come over rapidly at 94° C., at which temperature 94 grams of ethyl chlorocarbonate will be obtained, producing a 90% yield. The residue in the distilling flask amounting to 5 c. c. is a mixture of ethyl chlocarbonate and diethyl carbonate.

Instead of using water alone as a solvent to form the separate layers in the above process, water and any other suitable solvent that is substantially immiscible with water may be used, as, for example, benzol, petroleum ether, carbon tetrachloride, etc. and, for example, when proceeding with carbon tetrachloride the procedure would be the same as above described except the carbon tetrachloride (solvent for the ester) should be first added to the mixture in order to come in intimate contact with the chlorocarbonate and then the water (solvent for the alcohol and hydrochloric acid) is added to separate the mixtures into two layers. The ester and carbon tetrachloride layer is the lower one, and is distilled to separate out the pure chlorocarbonate.

Furthermore, it will be understood that other chlorocarbonates may be formed in accordance with my invention in the same manner as above described, except that it will be necessary to use some other appropriate alcohol for forming the corresponding chlorocarbonate, and in this manner, for example, the following chlorocarbonates may be readily formed from the corresponding alcohols:

Methyl chlorocarbonate, propyl chlorocarbonate, butyl chlorocarbonate, amyl chlorocarbonate, phenyl chlorocarbonate.

While I have described my invention above in detail I wish it to be understood that many changes may be made therein without departing from the spirit of the same.

I claim:

1. The process which comprises forming an organic chlorocarbonate by bringing together phosgene and a liquid alcohol and washing the ester mixture with water and a solvent for the chlorocarbonate which is immiscible with water to form liquid layers.

2. The process which comprises forming an organic chlorocarbonate by bringing together phosgene and liquid ethyl alcohol and washing the ester mixture with water and a solvent for the chlorocarbonate which is immiscible with water to form liquid layers.

3. The process which comprises forming an organic chlorocarbonate by bringing together phosgene and a liquid alcohol and washing the ester mixture with water and carbon tetrachloride to form liquid layers.

4. The process which comprises forming an organic chlorocarbonate by bringing together phosgene and liquid ethyl alcohol and washing the ester mixture with water and carbon tetrachloride to form liquid layers.

5. The process which comprises forming an organic chlorocarbonate by bringing together phosgene and a liquid alcohol washing the ester mixture with water and a solvent for the chlorocarbonate which is immiscible with water to form liquid layers and distilling the chlorocarbonate layer.

6. The process which comprises forming an organic chlorocarbonate by bringing together phosgene and liquid ethyl alcohol, washing the ester mixture with water and a solvent for the chlorocarbonate which is immiscible with water to form liquid layers and distilling the chlorocarbonate layer.

7. The process which comprises forming an organic chlorocarbonate by bringing together phosgene and a liquid alcohol, washing the ester mixture with water and carbon tetrachloride to form liquid layers and distilling the chlorocarbonate layer.

8. The process which comprises forming an organic chlorocarbonate by bringing together phosgene and liquid ethyl alcohol, washing the ester mixture with water and carbon tetrachloride to form liquid layers and distilling the chlorocarbonate layer.

In testimony that I claim the foregoing, I have hereunto set my hand this 3d day of June, 1924.

JOHN A. S. HAMMOND.